July 20, 1954   A. A. GRIFFITH   2,683,962
JET PROPULSION NOZZLE FOR USE AT SUPERSONIC JET VELOCITIES
Filed Sept. 11, 1950
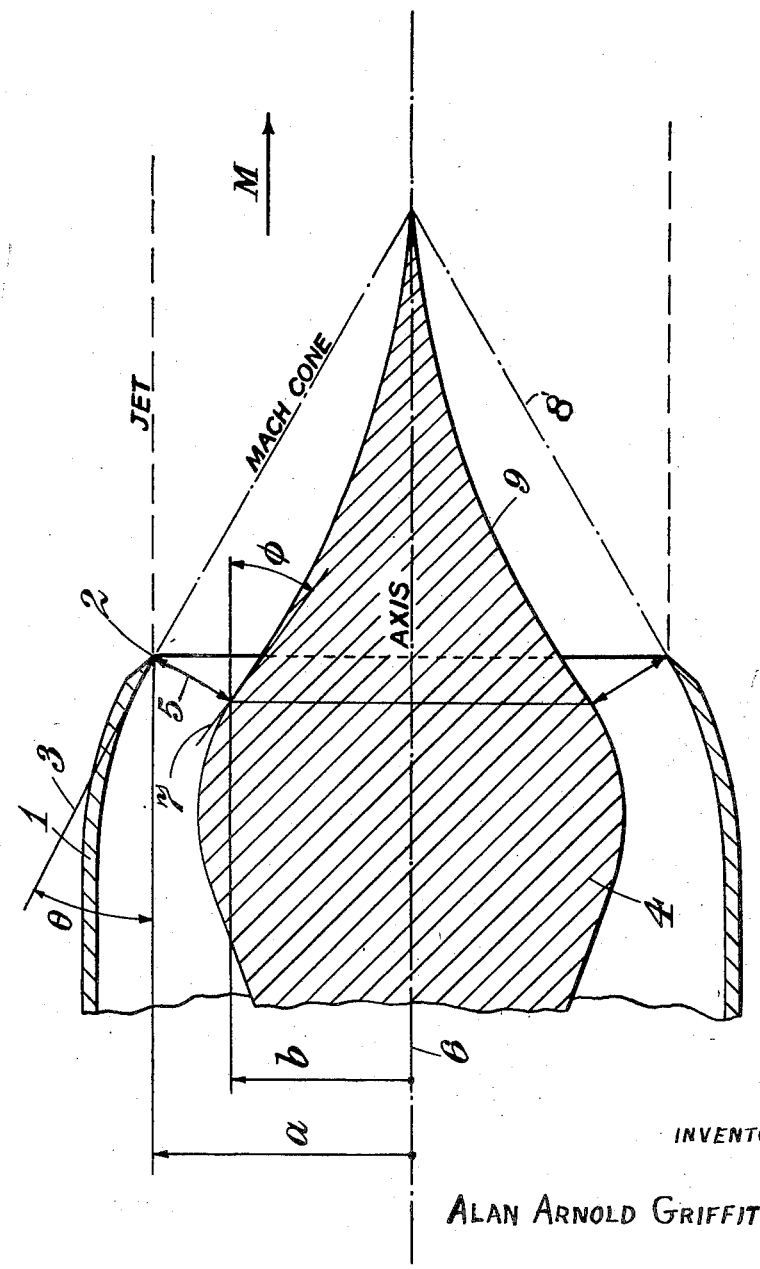
INVENTOR
ALAN ARNOLD GRIFFITH
By
Wilkinson & Mawhinney
ATTORNEYS Patented July 20, 1954

2,683,962

UNITED STATES PATENT OFFICE 2,683,962

JET-PROPULSION NOZZLE FOR USE AT SUPERSONIC JET VELOCITIES

Alan Arnold Griffith, Derby, England, assignor to Rolls-Royce Limited, Derby, England, a British company Application September 11, 1950, Serial No. 184,286

Claims priority, application Great Britain October 6, 1949

4 Claims. (Cl. 60—35.6)

This invention relates to nozzles for use with jet-propulsion units, such as gas turbine engines and rocket motors.

If a jet of gas has sonic velocity at the lip of a converging nozzle, and is then exposed to an atmosphere at a lower pressure, then the direction of flow of the gas undergoes refraction round the lip. If isentropic expansion of the jet to the final pressure produces a jet Mach number M, and if $\gamma$ is the ratio of specific heats, then the angle of refraction is $$\theta = \sqrt{\frac{\gamma+1}{\gamma-1}} \cdot \tan^{-1} \sqrt{\frac{\gamma-1}{\gamma+1}(M^2-1)} - \tan^{-1} \sqrt{M^2-1} \quad (1)$$

For example, if $M=2$ and $\gamma=1.4$, the angle would be solved as follows:
$\gamma+1=2.4$; $\gamma-1=0.4$; $M^2-1=3$, $\tan^{-1}x$ means the angle whose tangent is $x$.

$$\therefore \theta = \sqrt{\frac{2.4}{0.4}} \cdot \tan^{-1} \sqrt{\frac{0.4}{2.4} \cdot 3} - \tan^{-1} \sqrt{3}$$

$$= \sqrt{6} \cdot \tan^{-1} \sqrt{\tfrac{1}{2}} - \tan^{-1} \sqrt{3}$$

$$= 2.45 \ (35° \ 16') - 60°$$

$$= 86° \ 24' - 60°$$

$$= 26° \ 24', \text{ the angle of refraction}$$

In an ordinary converging nozzle, the sonic front or throat is substantially normal to the axis and hence the refraction causes a loss of thrust, since only the axial component of the outlet velocity contributes to the thrust.

A known method of avoiding this source of loss is to add a diverging part to the nozzle, downstream of the throat. By this means the sudden refraction is prevented by the constraint of the nozzle wall and it is theoretically possible to shape the latter so that the flow of the final supersonic jet is everywhere parallel to the axis of the nozzle. There is, however, a loss of thrust due to skin friction on the wall; moreover, when the nozzle is working at less than its design Mach number there is in addition a much larger loss due to over-expansion and subsequent recompression through a shock wave in the diverging channel.

This invention has for an object to provide an improved construction of jet nozzle for use at supersonic jet velocities in which loss of thrust due to refraction is substantially avoided and in which skin friction losses are diminished and losses due to over expansion and subsequent recompression are substantially avoided.

According to this invention an exhaust gas jet propulsion nozzle for use at supersonic jet velocities comprises an outer annular wall and an inner member located coaxially within the wall and cooperating with the wall to afford an annular outlet from the nozzle, the inner surface of the outer annular wall and the surface of the inner member being so shaped that the throat of the nozzle is formed between the lip of the outer wall and the surface of the inner member and that the normal to the sonic front as throat where it meets the lip makes an angle with the nozzle axis which is substantially the calculated angle of refraction $\theta$ as determined by the above equation for the design Mach number and which intersects the nozzle axis downstream of the nozzle.

According to a feature of this invention, it is arranged that downstream of the nozzle throat, the surface of the inner coaxial member downstream of the nozzle is shaped to have a generatrix which is concave, and to converge to have an apex located at a point on the nozzle axis at or upstream of the apex of the Mach cone from the lip of the outer wall.

One form of jet nozzle according to this invention is illustrated in the accompanying drawing which is an axial section through the nozzle.

The nozzle is a structure formed by rotation of the section shown about axis 6 and comprises an outer wall 1 having a lip 2 formed so that the tangent cone 3 to inner surface of the wall at the lip has a semi-apical angle equal to the expected angle of refraction $\theta$. The nozzle also comprises a coaxial inner member 4, the surface of which is shaped so that the sonic front produced at the throat of the nozzle lies in a surface which is formed by rotation about the nozzle axis 6 of line 5, which is slightly curved and is at its ends respectively normal to the generatrix of the tangent cone 3 and to the generatrix of the cone 7 formed by lines drawn tangential to the surface of member 4 at the points thereon where the throat meets the surface. The cone 7 is a semi-apical angle $\phi$.

Now, if $b$ be the radius of the surface of inner member 4 where it meets the surface in which the throat or sonic front lies and $a$ radius of the lip 2 of the outer boundary, the following equation must be satisfied in order that a throat may exist:

$$b \tan \phi = a \tan \theta \quad (2)$$

Hence $\phi$ is greater than $\theta$ and the surface in which the sonic front or throat lies is formed by the rotation of a slightly curved generating line about the axis, the tangents to this generating line at its points of intersection with the lip 2 and body 4 being normal to the inner surface of the outer wall 1 and to the surface of the member 4 respectively.

To a sufficient approximation, the throat area A is given by the equation:

$$A = \eta(a^2 - b^2) \sec \tfrac{1}{2}(\theta + \phi) \quad (3)$$

whilst the final jet area is $\eta a^2$. Since the ratio of final area to throat area is known independently from the design Mach number and the properties of the gas, the three equations given above are sufficient to determine the angles $\theta$ and $\phi$ and the ratio $b/a$. Hence the nozzle can be designed up to the throat.

The form of the extension of the surface of the inner member 4 downstream of the throat is as follows. If a Mach cone 8 is drawn converging from the lip 2 to the axis 6, then downstream of this cone the jet direction is wholly axial and the downstream limit of the surface inner member 4 is represented by the apex of the cone. At the throat or sonic front, the tangent cone has the semi-apical angle $\phi$. The downstream boundary of member 4 is therefore described by the rotation about the nozzle axis of a curved concave generatrix 9 which passes through the apex of the Mach cone 8 and has the angle $\phi$ at the throat. The best form of generating curve may be found by subjecting selected curves to the test of experiment.

The improved form of supersonic nozzle above described has the following advantages over the conventional diverging nozzle. At the design Mach number, it has very much less surface area exposed to the supersonic part of the jet stream so that friction losses are diminished and, at Mach numbers less than design there is no possibility of the formation of a wasteful internal shock wave such as occurs with the conventional nozzle.

I claim:

1. An exhaust gas jet propulsion nozzle for use at supersonic jet velocities comprising an outer annular wall and an inner member located coaxially within the wall and co-operating with the wall to afford an annular outlet from the nozzle the inner surface of the outer annular wall and the surface of the inner member being so shaped that the throat of the nozzle is formed between the lip of the outer wall and the surface of the inner member and that the normal to the sonic front at the lip intersects the nozzle axis downstream of the nozzle and makes an angle $\theta$ with the nozzle axis which is substantially given by $$\theta = \sqrt{\frac{\gamma+1}{\gamma-1}} \cdot \tan^{-1} \sqrt{\frac{\gamma-1}{\gamma+1}(M^2-1)} - \tan^{-1}\sqrt{M^2-1}$$

where $\gamma$ is the ratio of specific heats of the gas of the jet and $M$ is the Mach number of the jet to be produced.

2. An exhaust gas jet propulsion nozzle as claimed in claim 1 wherein the surface of the inner coaxial member downstream of the location at which the sonic front springs therefrom is shaped to have a generatrix which is concave, and to converge to lie within the Mach cone from the lip of the outer wall and on the nozzle axis.

3. An exhaust gas jet nozzle for producing a supersonic gas jet stream lying within a substantially cylindrical envelope comprising an outer annular wall and an inner member located coaxially within the wall, said outer annular member being formed with an inwardly-turned lip whereby a throat in which the gas reaches sonic velocity is formed between said lip and points of minimum distance to said inner member, said throat being of fully annular substantially frustoconical form and being coaxial with the nozzle axis and having its smaller end forwardly of a transverse plane containing the lip, and wherein the normal to the throat at the lip intersects the nozzle axis downstream of the plane of the lip and makes an angle $\theta$ with the nozzle axis which is substantially given by $$\theta = \sqrt{\frac{\gamma+1}{\gamma-1}} \cdot \tan^{-1} \sqrt{\frac{\gamma-1}{\gamma+1}(M^2-1)} - \tan^{-1}\sqrt{M^2-1}$$

where $\gamma$ is the ratio of the specific heats of the exhaust gas and $M$ is the Mach number in excess of unity of the jet stream produced by the nozzle.

4. An exhaust jet nozzle for a jet engine comprising an outer annular member having an inwardly converging portion terminating in an annular lip of smaller diameter than the diameter of the body portion of said annular member, an inner symmetrical member coaxial with said outer annular member having an upwardly curved portion and a downwardly sloping concave portion terminating rearwardly of said annular lip, the apex of said upwardly curved portion lying forward of said annular lip, the point of minimum diameter of said annular lip forming with the external surface of the downwardly sloping concave portion of said inner member a fully annular throat at the minimum port area of which gases being discharged rearwardly attain sonic velocity and where the gases down stream from said throat attain supersonic velocity, the generatrix of said sonic front being a slightly curved line normal to a tangent cone of said annular lip at its upper limit and normal to the tangent cone of the innermost wall of said throat at its lower limit, said inner symmetrical member terminating at the apex of the tangent cone of said annular lip whereby the gases discharged from said nozzle are in a jet stream lying within a substantially cylindrical envelope.

References Cited in the file of this patent

UNITED STATES PATENTS

| Number | Name | Date |
| --- | --- | --- |
| 2,409,177 | Allen et al. | Oct. 15, 1946 |
| 2,509,238 | Martin | May 30, 1950 |
| 2,540,594 | Price | Feb. 6, 1951 |
| 2,570,629 | Anxionnaz et al. | Oct. 9, 1951 |